United States Patent [19]
Smaardijk et al.

[11] Patent Number: 5,990,259
[45] Date of Patent: Nov. 23, 1999

[54] POLYKETONE POLYMER COMPOSITION

[75] Inventors: Abraham Adriaan Smaardijk; Hendrik De Wit, both of Amsterdam, Netherlands

[73] Assignee: Shell Oil Company, Houston, Tex.

[21] Appl. No.: 09/163,079

[22] Filed: Sep. 29, 1998

[51] Int. Cl.$^6$ .............................. C08G 8/02; C08G 14/00
[52] U.S. Cl. ..................... 528/126; 528/266; 528/220; 524/151; 524/194; 524/222; 524/291; 524/356
[58] Field of Search ...................... 528/220, 126, 528/206; 524/151, 194, 222, 291, 356

[56] References Cited

U.S. PATENT DOCUMENTS

| | | |
|---|---|---|
| 3,330,859 | 7/1967 | Dexter et al. . |
| 5,082,885 | 1/1992 | Kluttz et al. ............................ 524/347 |
| 5,286,786 | 2/1994 | Hoenig et al. . |

FOREIGN PATENT DOCUMENTS

| | | |
|---|---|---|
| 326223 | 8/1999 | European Pat. Off. . |
| 2311528 | 1/1997 | United Kingdom . |

OTHER PUBLICATIONS

Search Report dated May 18, 1999.

*Primary Examiner*—Duc Truong
*Attorney, Agent, or Firm*—Todd F. Volyn

[57] ABSTRACT

Polymer composition made by combining a polyketone polymer and a monophenolic compound of the general formula:

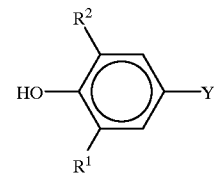

$R^1$ and $R^2$, independently, are hydrogen or alkyl groups with 1–6 carbon atoms, Y is an organic group from 3 up to 15 carbon atoms.

13 Claims, No Drawings

POLYKETONE POLYMER COMPOSITION

BACKGROUND OF THE INVENTION

This invention relates to polyketone polymer compositions. More particularly, this invention relates to polyketone polymer compositions containing a stabilizer acting against long term heat degradation during their end-use.

Polymers of carbon monoxide and ethylenically unsaturated compounds, generally referred to as polyketones or polyketone polymers, are well known in the art. The class of linear alternating polymers of carbon monoxide and at least one ethylenically unsaturated compound are of particular interest among polyketone polymers. This class of polymers is disclosed in numerous patent documents, exemplified by U.S. Pat. No. 4,880,865 and U.S. Pat. No. 4,818,811.

Polyketone polymers have utility as "Engineering Thermoplastics", or "ETP's", for which stringent end-use requirements apply. Since these plastics are used in high temperature applications, there is a strong need for effective stabilization against long term heat degradation during end-use applications.

In EP-A-289077 and EP-A-326223 it was found that only a few narrowly defined phenolic compounds produce desired stabilization against long term heat degradation in polyketone polymers. EP-A-289077 shows that the classes comprising diphenolic compounds, i.e. phenolic compounds with two phenolic groups provide good stabilization against long term heat degradation. EP-A-326223 teaches that particular classes of triphenolic compounds also provide good stability against long term heat degradation.

It was further shown in EP-A-289077 as well as EP-A-326223 that a monophenolic and a tetraphenolic compound, which are commercial top stabilizers against long term heat degradation for other polymers, result in very disappointing stabilization activity in polyketone polymers. The monophenolic compound is octadecyl 3-(3,5-di-t-butyl-4-hydroxyphenyl)propanoate, the tetraphenolic compound is pentaerythrityl tetrakis[3-(3,5-di-t-butyl-4-hydoxyphenyl) propanoate].

In "Kirk-Othmer, Encyclopaedia of Chemical Technology", third Edition, Volume 3, p. 133 it is taught that for high temperature applications polynuclear phenolic compounds are preferred over monophenolic compounds because of their lower sublimation rate. The sublimation rate of a compound is directly related to its molecular weight; the higher the molecular weight, the lower the sublimation rate. According to the common general knowledge a preference thus exists for the use of phenolic compounds having a relatively high molecular weight.

In U.S. Pat. No. 5,082,885 various phenolic compounds were described as having utility for the improvement of polyketone melt stability and high temperature heat stability. The stabilizers comprised one of the following moieties para to the hydroxyl group: hydrogen, hydroxy, lower alkoxy, alkyl of up to $C_{18}$, phenyl, halophenyl, or dialkyl hydroxyphenyl. The patent provides no direction for the selection of a $C_{3-15}$ organic group nor more particularly, such a group comprising a carboxylic acid, carboxylic ester, ether, or carboxylic amide moiety. Further, the patent is directed against such a selection because it shows the weak performance of compounds such as 2,6-di-t-butyl-4-methoxyphenol within the content of the testing protocol used (see, e.g., Table I).

The above findings correspond with the finding that 2,6-di-t-butyl-4-methylphenol, a low molecular weight monophenolic stabilizer, gives a low level of stability against long term heat degradation in polyketone polymers.

However, it has now surprisingly been found that good stability against long term heat degradation can be achieved in polyketone polymers by applying as stabilizer a monophenolic compound having a relatively low molecular weight, which belongs to a narrowly defined class. In addition, the resulting compositions show attractive melt stability, as well as attractive mechanical and physical properties.

SUMMARY OF THE INVENTION

The present invention is a polymer composition made by combining a polyketone polymer and a monophenolic compound of the formula:

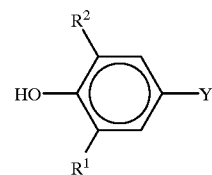

wherein
$R^1$ and $R^2$, independently, are hydrogen or alkyl groups with 1–6 carbon atoms,
Y is an organic group comprising from 3 up to 15 carbon atoms.

In one embodiment Y comprises one or more carboxylic acid groups, carboxylic ester groups, ether groups, carboxylic amide groups or combinations of such groups.

The invention further relates to a process for preparing the compositions according to this invention, comprising admixing the polyketone polymer and a monophenolic compound according to this invention.

DETAILED DESCRIPTION OF THE INVENTION

As regards $R^1$ and $R^2$, preference is given to monophenolic compounds in which $R^1$ is a linear alkyl group and $R^2$ is an alkyl group which causes steric hindrance, i.e. an alkyl group comprising at least 3 carbon atoms, wherein the carbon atom attached to the aryl group is a tertiary or quartenary carbon atom. Examples of the latter are isopropyl, isoamyl, t-amyl, 2-butyl, t-butyl etc. In even more preferred monophenolic compounds each of $R^1$ and $R^2$, independently, is such a sterically hindering alkyl group.

Y is an organic group comprising from 3 up to 15 carbon atoms. Apart from carbon and hydrogen atoms, Y may comprise up to 5 hetero atoms such as oxygen, nitrogen and/or halogen. Typically, the total number of carbon atoms and hetero atoms does not exceed 15. Preferably, the total number of carbon atoms and hetero atoms (if present) varies from 4 up to 9. Oxygen and/or nitrogen are particularly used as the hetero atoms. They preferably form part of a carboxylic acid group, a carboxylic ester group, an ether group or a carboxylic amide group.

Examples of monophenolic compounds according to the invention are:
2,6-di-t-butyl-4-dodecylphenol
2-methyl-6-t-butyl-4-butylphenol
2-t.butyl-6-isopropyl-4-(2-ethoxyethyl)phenol)
3-(3,5-di-t-butyl-4-hydroxyphenyl)propanoic acid
3-(4-hydroxy-3-methyl-5-t-pentylphenyl)proprionamide
N-butyl-3-(4-hydroxy-3-methyl-5-t-butylphenyl) proprionamide N-methyl-(4-hydroxy-3-t-butyl-5-propylphenyl)acetamide
N,N-dimethyl-(4-hydroxyphenyl-3-t-butylphenyl) acetamide.

Preferred monophenolic compounds of the present invention are alkyl esters of hydroxyphenylalkane-carboxylic acids. The alkyl moieties of these esters are preferably saturated alkyl groups, which may or may not include ether linkages in the chain of carbon atoms. More preferred are alkyl moieties which are linear saturated alkyl groups and which may or may not include an –(O—CH$_2$—CH$_2$–)-ether linkage in the chain of carbon atoms.

Examples of preferred monophenolic compounds according to this invention are:

hexyl 3-(3,5-di-t-butyl-4-hydroxyphenyl)proprionate
octyl 4-(4-hydoxy-3,5-dimethylphenyl)butanoate
ester of 3-(3,5-di-t-butyl-4-hydroxyphenyl)propanoic acid and triethyleneglycol monomethylether
ester of 3-(3,5-di-t-butyl-4-hydroxyphenyl)propanoic acid and ethoxyethanol
ethyl 3-(4-hydroxyphenyl)]proprionate
ester of 3-(3-t-butyl-5-methyl-4-hydroxyphenyl)propanoic acid and triethyleneglycol monomethylether
ester of 3-(4-hydroxyphenyl)propanoic acid and triethyleneglycol monoethylether.

A most preferred monophenolic compound for use in this invention is methyl 3-(3,5-di-t-butyl-4-hydroxyphenyl) proprionate. This compound can be prepared according to e.g. the method described in U.S. Pat. No. 3,330,859.

Other polymer additives, well known in the art, can be used as a further component of the polyketone compositions of this invention. For instance, fillers, extenders, lubricants, pigments, plasticizers and other (polymeric) materials can be added to the polyketone compositions being stabilized to improve or otherwise alter the properties of the compositions.

However, it is preferred that alkanolamine esters of diaryl phosphites are not used as stabilisers in the compositions of this invention, which means that they will not be present or, if present, that they are present in a quantity of less than 0.05% w, in particular less than 0.01% w, more in particular less than 0.005% w, based on the weight of the polyketone polymer. This relates in particular to 2,2',2"-nitrilotriethanol-tris(3,3',5,5'-tetra-tert-butyl-1,1'-biphenyl-2,2'-diyl)-phosphite, disclosed in U.S. Pat. No. 4,318,845. It has been found that without such compounds being present the compositions of this invention have better stability under the conditions of melt processing, such as extrusion and injection moulding, i.e. they are better in retaining melt viscosity and colour.

The polyketones for use in this invention are typically linear alternating polymers of carbon monoxide and at least one ethylenically unsaturated compound. Thus, these polyketone polymers typically contain one molecule of carbon monoxide for each molecule of the ethylenically unsaturated compound. Ethylenically unsaturated compounds comprise suitably up to 20 carbon atoms and include compounds which consist exclusively of carbon and hydrogen and compounds which in addition comprise hetero atoms, such as unsaturated esters, ethers and amides. Unsaturated hydrocarbons are preferred. Examples of suitable ethylenically unsaturated monomers are aliphatic α-olefins, such as ethene, propene, butene-1 and hexene-1, cyclic olefins such as cyclopentene, aromatic compounds, such as styrene and α-methylstyrene and vinyl esters, such as vinyl acetate and vinyl propionate. The preferred polyketone polymers are linear alternating polymers of carbon monoxide and ethene or linear alternating polymers of carbon monoxide, ethene and an ethylenically unsaturated compound of at least 3 carbon atoms, particularly an α-olefin such as propene.

When the preferred polyketone polymers of carbon monoxide, ethene and another ethylenically unsaturated compound are employed, there will be within the polymer typically at least 2 units incorporating a moiety of ethene for each unit incorporating a moiety of the other ethylenically unsaturated compound(s). Preferably, there will be from 10 units to 100 units incorporating a moiety of ethene for each unit incorporating a moiety of the other ethylenically unsaturated compound(s). The polymer chain of preferred polyketone polymers is therefore represented by the repeating formula

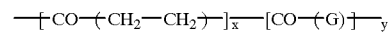

where G is the moiety of the ethylenically unsaturated compound of at least 3 carbon atoms polymerized through the ethylenic unsaturation. The ratio of y:x is typically no more than 0.5 and preferably from 0.01 to 0.1. When linear alternating polymers of carbon monoxide and ethene are employed in the compositions of the invention, there will be no second ethylenically unsaturated compound present and the polymers are represented by the above formula wherein y is zero. When y is other than zero the —CO–(CH$_2$—H$_2$–) units and the —CO–(G–) units are found randomly throughout the polymer chain. The precise nature of the end groups does not appear to influence the properties of the polymer to any considerable extent so that the polymers are fairly represented by the formula for the polymer chains as depicted above.

The polyketone polymers of number average molecular weight from 1,000 to 200,000, particularly those of number average molecular weight from 20,000 to 90,000 as determined by gel permeation chromatography are of particular interest. The physical properties of the polymer will depend in part upon the molecular weight, whether the polymer is based on a single or on a plurality of ethylenically unsaturated compounds and on the nature and the proportion of the ethylenically unsaturated compounds. Typical melting points for the polymers are from 175° C. to 300° C., more typically from 210° C. to 270° C., as determined by differential scanning calorimetry. The polymers have typically a limiting viscosity number (LVN), measured in m-cresol at 60° C. in a standard capillary viscosity measuring device, from 0.5 dl/g to 10 dl/g, more typically from 0.8 dl/g to 4 dl/g.

Preferred methods for the production of the polyketone polymers are known from U.S. Pat. No. 4,808,699 and U.S. Pat. No. 4,868,282. U.S. Pat. No. 4,808,699 teaches the production of polyketone polymers by contacting ethene and carbon monoxide in the presence of a catalyst comprising a Group VIII metal compound, an anion of a nonhydrohalogenic acid with a pKa less than 6 and a bidentate phosphorus, arsenic or antimony ligand. U.S. Pat. No. 4,868,282 teaches the production of polyketone polymers by contacting carbon monoxide and ethene in the presence of one or more other hydrocarbons having an ethylenically unsaturated group with a similar catalyst.

The compositions of this invention are made by admixing a quantity of the monophenolic compound with the polyketone polymer. Suitably the quantity of the monophenolic compound amounts to 0.01–10% w, relative to the quantity of the polyketone polymer. More suitably this is 0.05–5% w, and in particular 0.1–3% w, on the same basis.

The monophenolic compound may be incorporated into the polyketone polymer at any stage of the polymer's processing, preferably prior to being subjected to elevated temperature. Any of the conventional methods suitable for forming a mixture of the polymer and the monophenolic compound may be used to form the mixture so long as the method results in a substantially uniform blend of the composition components. Such methods are in general melt processing methods and may include dry blending of the polymer and the monophenolic compound in a finely divided form followed by melt extrusion of the mixture. Techniques such as solvent deposition may also be used, as well as other methods known by those skilled in the art.

The compositions of this invention can be processed into articles of manufacture such as fibres, sheets, films, laminates, containers, tubes, piping and articles having an intricate shape by conventional processing techniques such as melt-spinning, extrusion, coextrusion, blow moulding, compression moulding, injection moulding and solid phase pressure forming. The invention is of special importance in applications in which stability of finished articles of manufacture is essential (i.e. end-use stability is required).

The invention will be further illustrated by the following nonlimiting examples.

EXAMPLE 1

For Comparison

The following additives were tested for their stabilizing performance against long term heat degradation:
1) 2,6-di-t-butyl-4-methylphenol
2) octadecyl 3-(3,5-di-t-butyl-4-hydroxyphenyl)propanoate.

For an oven life test, test specimen (dumbbells, Die S3 size) were stamped from 1 mm thick sheets which were prepared by compression moulding of a composition of an ethene/propene/carbon monoxide terpolymer having an alternating structure, a melting point of 206° C. and an intrinsic viscosity of 1.4 dl/g (measured in m-cresol at 60° C.), and the additive to be tested. The test specimens were subjected to aerobic oven ageing tests at 90° C. for 7 days and subsequently tested for elongation at break according to DIN 53504 (crosshead speed 20 mm/min, conditioning and test conditions 23° C./50% relative humidity).

The results are indicated in Table I in terms of relative performance, which is the retained elongation at break after oven ageing relative to the retained elongation at break found after oven ageing for the sample containing additive 2. The concentration is expressed in % w of the monophenolic compound, relative to the quantity of the polyketone polymer.

TABLE I

| Additive[1] | concentration (% w), | relative performance |
|---|---|---|
| 1 | 1.0 | 0.7 |
| 2 | 1.0 | 1.0[2] |

[1]for comparison
[2]by definition

EXAMPLE 2

The following additives were tested for their stabilizing performance against long term heat degradation:
2) octadecyl 3-(3,5-di-t-butyl-4-hydroxyphenyl)propanoate
3) methyl 3-(3,5-di-t-butyl-4-hydroxyphenyl)proprionate.

For an oven life test, at least 5 strips (10 mm wide) were cut from 1 mm thick sheets which were prepared by compression moulding of a composition of an ethylene/propylene/carbon monoxide terpolymer having an alternating structure, having an LVN of 1.8 dl/g and a melting point of 222° C., and the additive to be tested. These strips were subjected to oven aerobic oven ageing tests at 125° C. The strips were tested at regular time intervals by cooling them to room temperature for 1 hour and subsequently bending the strips over 90° over a rounded supporting edge. Oven life was reached when 50% of the strips broke upon bending.

Similar to Example 1, the results are indicated in Table II in terms of relative performance, which is the oven life for the sample containing additive 3 relative to the oven life for the sample containing additive 2. The concentration is expressed in % w of the monophenolic compound, relative to the quantity of the polyketone polymer.

TABLE II

| Additive | Conc. (% w) | Relative performance |
|---|---|---|
| 2[1] | 0.5 | 1.0[3] |
| 3[2] | 0.5 | 1.9 |

[1]for comparison
[2]according to the invention
[3]by definition

The comparative Example demonstrates that the stabilization against long term heat degradation of additive 2, which is a high molecular weight monophenolic compound, is better than that of additive 1, which is a low molecular weight monophenolic compound. This demonstrates the preference for high molecular weight phenolic compounds, in accordance with the common general knowledge.

However, Example 2 surprisingly demonstrates that additive 3, a low molecular weight monophenolic compound according to the invention, outperformes comparative additive 2 and therefore comparative additive 1 as well.

Herewith it is shown that the additives according to the current invention provide enhanced stabilization against long term heat degradation during end-use.

We claim:

1. Polymer composition comprising a polyketone polymer combined with a monophenolic compound of the formula:

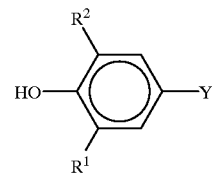

wherein $R^1$ and $R^2$, independently, are hydrogen or alkyl groups with 1–6 carbon atoms, Y is an ester moiety comprising 3 to 15 carbon atoms.

2. The composition of claim 1 wherein Y comprises one or more carboxylic acid groups, carboxylic ester groups, ether groups, or carboxylic amide groups or combinations of such groups.

3. A polymer composition as claimed in claim 1, wherein the quantity of the monophenolic compound is from 0.05–5% w, relative to the quantity of the polyketone polymer.

4. A polymer composition as claimed in claim 1, wherein Y comprises up to 5 hetero atoms provided that the total number of carbon atoms and hetero atoms does not exceed 15.

5. A polymer composition as claimed in claim 1, wherein in Y the total number of carbon atoms and hetero atoms, if present, does not exceed 9.

6. A polymer composition as claimed in claim 1, wherein the monophenolic compound is an alkyl ester of a hydroxyphenylalkane carboxylic acid, and wherein the alkyl moiety is a saturated alkyl group, optionally comprising ether linkages.

7. A polymer composition as claimed in claim 6, wherein the monophenolic compound is methyl 3-(3,5-di-t.butyl-4-hydroxyphenyl)proprionate.

8. A polymer composition as claimed in claim 1, wherein the polyketone polymer is a linear alternating copolymer of carbon monoxide and at least one ethylenically unsaturated compound.

9. A polymer composition as claimed in claim 8, wherein the polyketone polymer is a linear alternating copolymer of carbon monoxide, ethene and propene or a linear alternating polymer copolymer of carbon monoxide and ethene only.

10. A process for preparing a polymer composition, comprising admixing a polyketone polymer and a monophenolic compound of the formula:

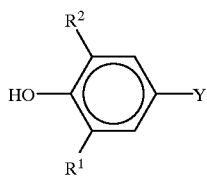

wherein $R^1$ and $R^2$, independently, are hydrogen or alkyl groups with 1–6 carbon atoms, Y is an ester moiety comprising 3 to 15 carbon atoms.

11. The process of claim 10 wherein Y comprises one or more carboxylic acid groups, carboxylic ester groups, ether groups, carboxylic amide groups, or combinations of such groups.

12. A process for stabilizing polyketones against long term heat degradation comprising admixing said polyketone with a monophenolic compound of the formula:

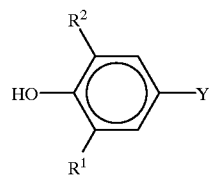

wherein $R^1$ and $R^2$, independently, are hydrogen or alkyl groups with 1–6 carbon atoms, Y is an ester moiety comprising 3 to 15 carbon atoms.

13. A process for stabilizing polyketones against long term heat degradation comprising admixing said polyketone with a monophenolic compound of the formula:

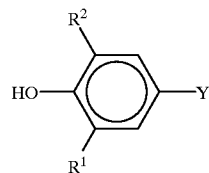

wherein $R^1$ and $R^2$, independently, are hydrogen or alkyl groups with 1–6 carbon atoms, Y is an ester moiety comprising 3 to 15 carbon atoms.

* * * * *